Figure 1:
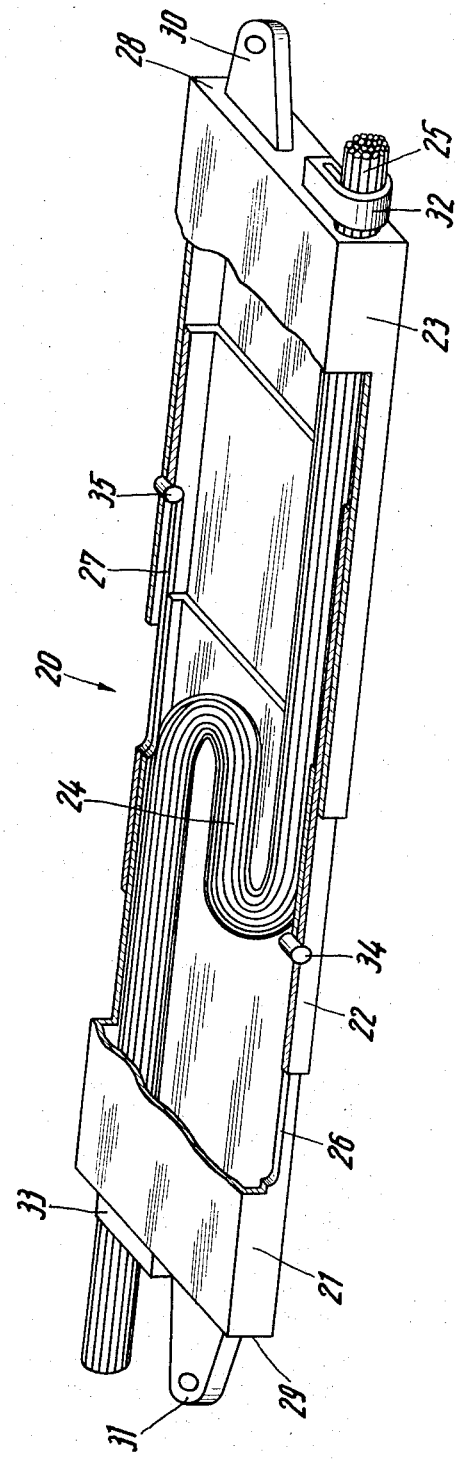

United States Patent [19]

Stengel et al.

[11] 3,792,189
[45] Feb. 12, 1974

[54] TELESCOPIC CABLE GUIDE

[75] Inventors: Max Stengel; Werner Kollmer; Manfred Grassl, all of Munich, Germany

[73] Assignee: Messerschmit-Bolkow-Blohm GmbH, Munich, Germany

[22] Filed: July 24, 1972

[21] Appl. No.: 274,492

[30] Foreign Application Priority Data
Feb. 11, 1972 Germany.............................. 2206404

[52] U.S. Cl............. 174/69, 174/DIG. 9, 191/12 R, 312/273
[51] Int. Cl. .................................................. H01b 7/06
[58] Field of Search174/69, 52 R, DIG. 9; 312/273, 312/230; 248/323; 191/12 R

[56] References Cited
UNITED STATES PATENTS 3,061,252  10/1962  Berry, Jr. et al................. 312/273 X
3,270,253  8/1966  Binder et al...................... 174/69 X Primary Examiner—Darrell L. Clay
Attorney, Agent, or Firm—Woodhams, Blanchard & Flynn

[57] ABSTRACT

Telescopic guide for conducting a flexible cable between relatively moving parts. For positioning between relatively moving parts, such as an aircraft fuselage and a swingable wing connected thereto, there is provided a housing comprising telescopic parts, said housing being positioned between the relatively moving parts and conducting the cable therethrough. The cable is clamped at either end of the housing and a loop maintained in the cable in at least all positions other than the fully extended position of the telescopic housing. Pin and slot arrangements between the telescopic parts of the housing provide a positive limit to the extension of the housing and thereby assure that the housing will not be unduly extended and result in either damage to the housing or damage to the cable.

7 Claims, 6 Drawing Figures

TELESCOPIC CABLE GUIDE

The invention relates to a telescopic guide for protecting electric cables which provide the electric connection between movable structural parts which are, for example, used in air and space vehicles.

Cable guides as such are already known in air and space vehicles. Preferably, so-called cable shears are here used which are based on the principle of the "Nurnberg Shears," whereby the cable which is arranged between the guiding structure and joints of the shears is guided from one fulcrum point to the adjacent fulcrum point and thus an arrangement is created which makes it possible to carry a cable over a desired open zone. Particularly for the cable bundle of an aircraft network which, due to the plurality of combined individual cable strands, has a considerable stiffness, there is needed a cable shears having a very solid and strong construction. This does not only undesirably increase the entire weight of the body of the aircraft but it also increases the space needed since the areas around the shears must also be kept free so that the capability of movement arising from the inherent instability of the shears is not affected. A further disadvantage of these known arrangements is an often excessive mechanical cable load. As tests show, the passing of a cable through the cable shears leads after the relatively short time of about a thousand operating cycles, to a mashing and to excessive and dangerous wear of the cable.

Therefore, the purpose of the invention is to overcome these disadvantages and to produce a strong, stable cable guide in which wear of the wires is reduced to a minimum and a damage to the cable through outside causes is avoided.

This purpose is attained by hingedly clamping a housing, which consists of several parts which can be moved telescopically into one another, between the parts which are movable with respect to one another, including between a fixed and a movable part, and by storing in the housing the length compensating loop of the electric cable. Through these measures there is provided a locally and strongly based arrangement with a limited space requirement and good stiffness. At the same time there is provided a protective device for the movable parts of the electric cable. Wear points are here reduced to a minimum and the cable path geometry is substantially simplified. Instead of the generally used circular cross section of the cables the use of a tape cable bundle is possible if desired.

It is furthermore suggested that the parts which are movable telescopically into one another are guided each in only one lateral slot which slots are arranged longitudinally offset to one another. This permits fixing in a simple manner the two limit positions and consequent simplification of manufacture.

In a modification of the invention it is suggested that the support plates for the clamping bolts and the clamping plates are arranged on the front surfaces of the housing. In this manner the lengthwise fixing of the cable takes place also directly at the hinge points of the housing.

It is furthermore suggested that the slide surfaces of the telescopic parts be coated with a friction-reducing layer, for example, Teflon. Through this method the usual friction resistance is reduced or overcome.

The invention is described and illustrated in connection with one exemplary embodiment.

Figure 2:
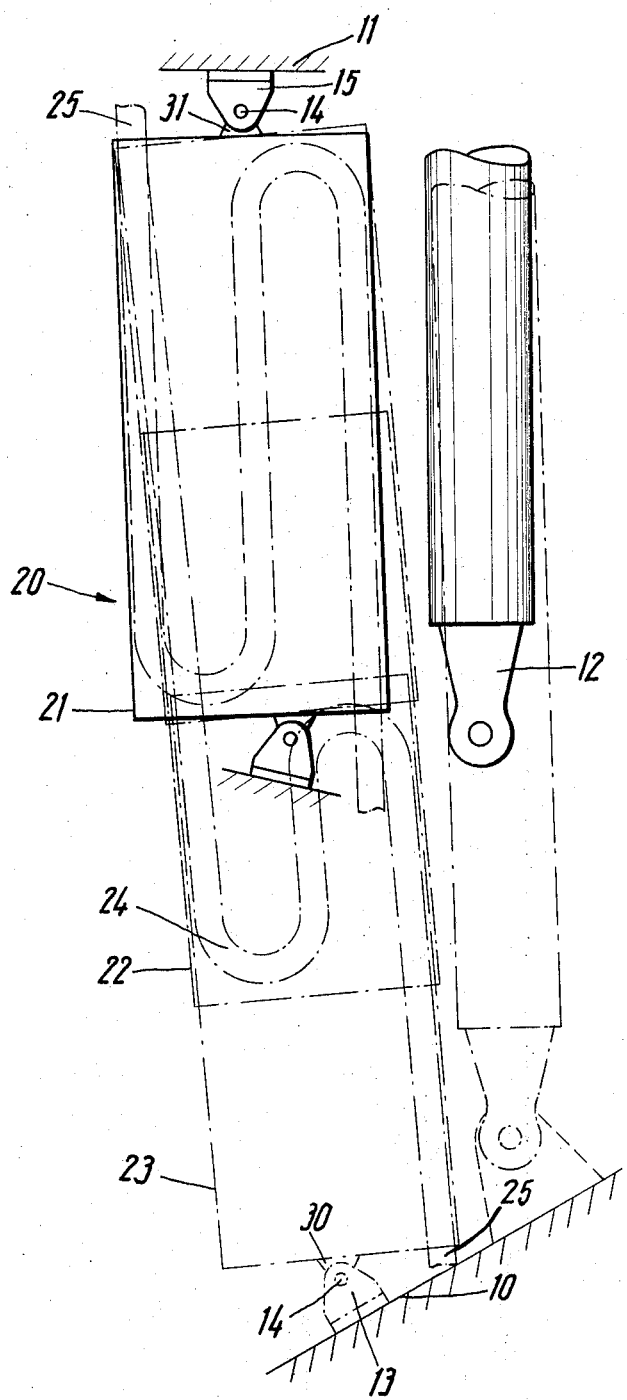
Figure 3:
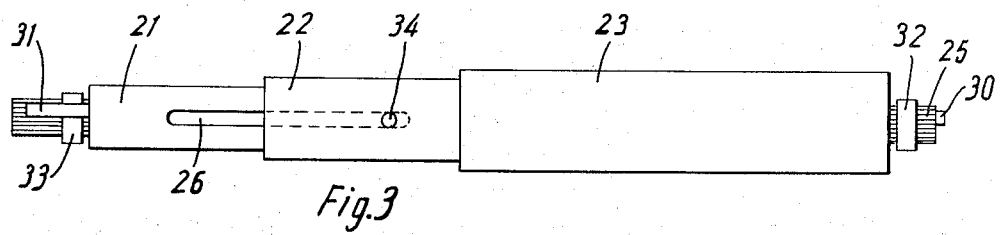
Figure 4:
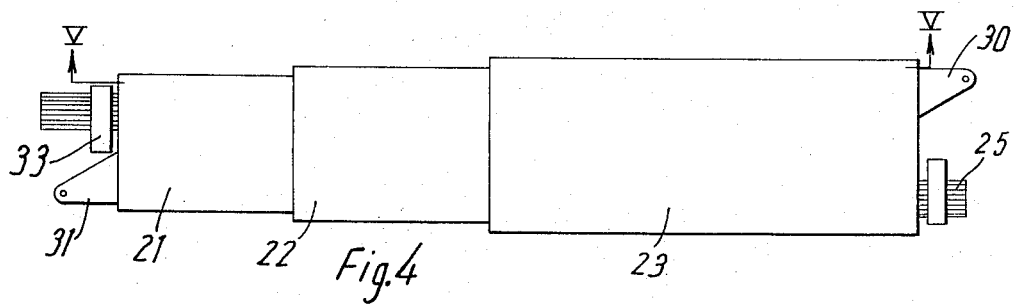
Figure 5:
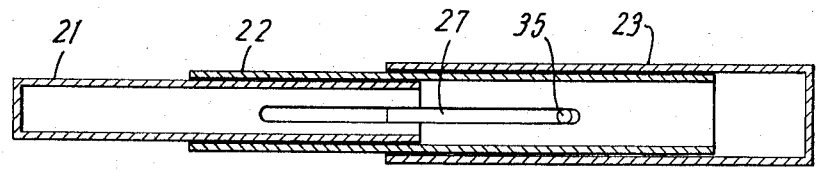
Figure 6:
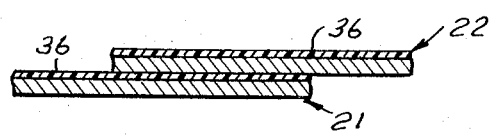

In the drawings:

FIG. 1 is a perspective view of the invention;
FIG. 2 is a top view of the arrangement in each of the two end positions;
FIG. 3 is a side view of the invention;
FIG. 4 is a top view thereof;
FIG. 5 is a sectional view taken along the line V—V in FIG. 4; and
FIG. 6 is an enlarged section of a fragment of FIG. 5.

The exemplary embodiment of the invention illustrated in FIGS. 1 and 2 relates to an arrangement in which an electrical cable 25 comprising the usual bundle of wires shown at 15A is arranged between the fixed fuselage part 11 of an aircraft and a relatively movable part 10. In the example from which the present description is taken, the latter is a swingable wing operated by an actuator 12. Between these two parts 10, 11 there is supported a cable housing 20 which consists of three hollow parts 21, 22, 23. On the opposite ends of housing 20 are end plates 30, 31 which are located and held by means of bolts 14 in support plates 13, 15. These cable housing parts 21, 22, 23 are in this embodiment each rectangular in both transverse and longitudinal section and are movable telescopically into one another. Preferably, the individual slide surfaces thereof are coated with a friction-reducing film 36, for example, Teflon, to improve their sliding capacity. The end position limit of the individual housing parts is determined through slot connections 26, 27 which are longitudinally offset with respect to one another on the side surfaces. Here, for example, on one side of the housing part 21 there is provided the slot 26 which is engaged by a pin 34 on the housing part 22. On the side of the housing part 22 opposite the pin 34 there is arranged a slot 27 in which is guided a pin 35 of the housing part 23. The slot 27 begins at a point transversely across from the pin 34, that is, it starts at a point opposite from where the slot 26 of the housing part 21 ends. Cable clamps 32 and 33 of any conventional type are preferably mounted on the ends 28 and 29, respectively, of the housing 20 and grip the cable to hold portions of same fixed with respect to said end walls and to assure the forming and maintaining of the loop 24.

Thus, an end position location is provided in a simple manner and with the minimum parts, which means assures that the cable in the housing 20 is not exposed to an additional tensile load. During each movement of the swinging wing 10, the cable 25 can now slide as needed without fear of wear or a damage. The S-shaped curved loop 24 of greater or lesser size will be present in the housing at all times and such loop is enlarged or reduced depending only on the operating position. In this instance, the amount of cable in the S-shaped loop will vary inversely proportional to the spacing between the end walls 28 and 29. That is, the amount of cable in the loop 24 will decrease with increasing spacing and increase with decreasing spacing.

The embodiments of the invention in which exclusive property or privilege is claimed are defined as follows:

1. In a telescopic guide for housing and protecting electric cable means creating the electric connection between relatively movable structural parts, the improvement comprising:

means defining an elongated housing, said housing means consisting of a plurality of sections movable telescopically into one another and a pair of end wall means movable toward and away from each other;

electrical conducting cable means mounted in said housing means and comprising at least one flexible electrically conducting cable, opposite ends of said electrically conducting cable being connected to and extending between said end wall means of said elongated housing means; and electrically conducting arcuate loop means positioned intermediate the ends of and connected in circuit with said electrical conducting cable means, the amount of cable in said loop means varying inversely proportional to the spacing between said end wall means by decreasing as said end wall means become increasingly spaced and increasing as said end wall means become closer spaced whereby said loop means permits an accomodation in the change in spacing between said end wall means due to a telescoping of said sections.

2. The improvement according to claim 1, wherein said arcuate loop means is S-shaped.

3. The improvement according to claim 2, wherein a portion of said cable on one side of said loop means is straight and is positioned adjacent one side of said housing means and connected to one of said pair of end wall means;

wherein a portion of said cable means on the other side of said loop means is straight and is positioned adjacent the other side of said housing means and connected to the other one of said pair of end wall means; and wherein said S-shaped loop means connects said straight cable portions.

4. The improvement according to claim 3, wherein said sections of said elongated housing means comprises hollow members of progressively decreasing cross section, one of said hollow members being slidingly received in an adjacent hollow member; and wherein a pair of remote hollow members have said wall means thereon; and wherein said loop means is positioned inside the arrangement of said hollow members.

5. The improvement according to claim 4, wherein said hollow members have a rectangular cross section.

6. The improvement according to claim 4, wherein said hollow members have a friction reducing coating thereon to thereby facilitate said telescoping relative movement.

7. The improvement according to claim 5, wherein a plurality of said hollow members have means defining aligned, longitudinally extending elongated slots in the side walls thereof; and wherein at last one of said hollow members is free of elongated slot means and has pin means thereon received in said aligned elongatd slots, the ends of said slots positively limiting the spacing between said end wall means in both the extended and retracted positions of said plurality of hollow members.

* * * * *